United States Patent
Dumas et al.

(10) Patent No.: US 11,127,376 B2
(45) Date of Patent: Sep. 21, 2021

(54) METHOD FOR RENDERING A CURRENT IMAGE ON A HEAD-MOUNTED DISPLAY, CORRESPONDING APPARATUS, COMPUTER PROGRAM PRODUCT, AND COMPUTER READABLE CARRIER MEDIUM

(71) Applicant: Thomson Licensing, Cesson-Sevigne (FR)

(72) Inventors: Olivier Dumas, Cesson-Sevigne (FR); Bertrand Leroy, Cesson-Sevigne (FR); Fabien Danieau, Cesson-Sevigne (FR)

(73) Assignee: Thomson Licensing, Cesson-Sevigne (FR)

( * ) Notice: Subject to any disclaimer, the term of this patent is extended or adjusted under 35 U.S.C. 154(b) by 0 days.

(21) Appl. No.: 16/766,315

(22) PCT Filed: Nov. 22, 2018

(86) PCT No.: PCT/EP2018/082282
§ 371 (c)(1),
(2) Date: May 22, 2020

(87) PCT Pub. No.: WO2019/105847
PCT Pub. Date: Jun. 6, 2019

(65) Prior Publication Data
US 2020/0365117 A1    Nov. 19, 2020

(30) Foreign Application Priority Data
Nov. 30, 2017  (EP) ..................... 17306666

(51) Int. Cl.
G09G 5/37  (2006.01)
G06F 3/01  (2006.01)
G06T 3/60  (2006.01)

(52) U.S. Cl.
CPC ............... *G09G 5/37* (2013.01); *G06F 3/012* (2013.01); *G06T 3/60* (2013.01); *G09G 2340/0492* (2013.01); *G09G 2354/00* (2013.01)

(58) Field of Classification Search
CPC ............. G09G 5/37; G09G 2340/0492; G09G 2354/00; G06F 3/012; G06T 3/60
See application file for complete search history.

(56) References Cited

U.S. PATENT DOCUMENTS

2009/0040308 A1   2/2009  Temovskiy
2015/0084850 A1   3/2015  Kim et al.

*Primary Examiner* — Jeffery A Brier
(74) *Attorney, Agent, or Firm* — Vincent Edward Duffy

(57) ABSTRACT

A method for rendering a current image on a head-mounted display is provided. The current image has been acquired by a camera mounted on a moving object. First, the capturing roll angle is obtained. It is compared to the viewing roll angle that is the current roll angle of the head of a user of the head-mounted display. If the difference between the capturing roll angle and the current viewing roll angle is lower than a determined threshold, a detection flag is activated. The current image is then rotated by an angle determined according to the capturing roll angle, the current viewing roll angle and of the detection flag. The current rotated image is rendered.

15 Claims, 6 Drawing Sheets

METHOD FOR RENDERING A CURRENT IMAGE ON A HEAD-MOUNTED DISPLAY, CORRESPONDING APPARATUS, COMPUTER PROGRAM PRODUCT, AND COMPUTER READABLE CARRIER MEDIUM

This application claims the benefit, under 35 U.S.C. § 365 of International Application PCT/EP2018/082282, filed Nov. 22, 2018, which was published in accordance with PCT Article 21(2) on Jun. 6, 2019, in English and which further claims the benefit of priority application EP17306666.3, filed on Nov. 30, 2017.

1. TECHNICAL FIELD

The present disclosure lies in the field of immersive system. More particularly, the present disclosure relates to a technique for rendering a current image on a head-mounted display, that allows reducing unpleasant side effect such as motion cyber sickness that may compromise the immersive experience.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Thanks to devices such as head-mounted display, 360-degree videos and virtual reality experiences now invade the entertainment market, allowing the spectator to be immersed in the heart of the media. The user's immersive experience may however be altered by what is usually refer to as cyber motion sickness. Cyber motion sickness is a common side effect of virtual reality, occurring when a disagreement exists between visually perceived movement and the vestibular system's sense of movement, i.e. the brain has trouble reconciling the movement the eyes are seeing with the lack or the desynchronization of motion the body is feeling. As a result, the user may feel unpleasant sensations that may even make him sick. Such side effect is even more likely to occur when the scene rendered in the display device (the head-mounted display) is a scene acquired from a moving point-of-view, such as, for example, a scene captured with a camera embedded in a moving vehicle (car, roller coaster carriage, etc.).

Some methods exist to reduce this discomfort, such as, for example, increasing the screen resolution, decreasing the latency between head motion and the effect on the images, or adding some fixed visual reference objects—such as a virtual cockpit or a virtual nose—within the user's field of view. However, implementing these methods does not allow preventing motion cyber sickness in all situations. In particular, these methods are not sufficient to prevent unpleasant feelings that may appear when image rendering within the head-mounted display involves both user's head roll motion and virtual roll motion due to the variation of the roll angle of the image capturing device at the time of image acquisition. Examples of such situations are schematically illustrated in relation with FIGS. 1a, 1b, 2a and 2b.

In these examples, the rendered scene—a vertical cylindrical tower 11 on a flat terrain 12—has been previously captured by an image capturing device (for example a camera) embedded on a moving vehicle, such as a roller coaster carriage. The scene is rendered in the frame of reference 14 of a head-mounted display worn by the user. The frame of reference of the camera is also schematically represented by a dotted rectangle 15 in the figures.

FIGS. 1a and 1b pertain to a situation where the camera was not laterally tilted (zero roll angle) during the acquisition, for example because the carriage on which the camera was embedded was riding straight ahead on a flat surface. Within the frame of reference of the camera, the horizon 13 is thus horizontal. On the initial situation illustrated in relation with FIG. 1a, the head-mounted display—that is the user's head—is vertical. If the user laterally tilts his head on the right, as illustrated in relation with FIG. 1b, a conventional head-mounted display renderer takes the roll component into account to compensate the tilting and keep the horizon 13 horizontal. In other words, the renderer operates a reverse rotation of the image according to the frame of reference 14 of the head-mounted display to keep the visual perception of the image consistent with the vestibular system perception. Therefore, such a situation should not cause cyber motion sickness, provided the latency between head motion and the reverse rotation of the image remains low.

Although efficient in the use case described in relation with FIGS. 1a and 1b, this renderer's conventional method to compensate the head roll motion reaches its limits in more complex situation such as the one now presented in relation with FIGS. 2a and 2b. FIGS. 2a and 2b pertain to a situation where the camera was laterally tilted on the right (non-zero roll angle) during the acquisition, for example because the carriage on which the camera was embedded was turning right. As a result, within the frame of reference 15 of the camera, the horizon 13 is not horizontal but seems to dive on the left. On the initial situation illustrated in relation with FIG. 2a, the head-mounted display—that is the user's head—is vertical. The user thus sees the horizon 13 as if he has laterally tilted his head on the right, although he hasn't. He is thus already in an uncomfortable situation. Trying to find a correspondence between the image and his head position, the user may be tempted to laterally tilt his head on the right. Such a motion leads to the situation illustrated in relation with FIG. 2b, the renderer having compensated the head roll motion according to the conventional method previously presented in relation with FIGS. 1a and 1b. However, as it can be seen on FIG. 2b, such a motion does not improve the user's situation, since the angle between the frame of reference 14 of the head-mounted display and the horizon 13 becomes even bigger. The disagreement between visual perception and vestibular system perception persists. The situation is not improved, and the user may still feels uncomfortable: he may get motion sick or lose his balance.

It would hence be desirable to provide a technique that allows rendering a current image in a head-mounted display that would avoid at least some of these drawbacks of the prior art, and thus improve the immersive experience.

3. SUMMARY

According to an aspect of the present disclosure, a method for rendering a current image on a head-mounted display is disclosed. The current image has been acquired by an image capturing device mounted on a moving object. The proposed method for rendering a current image comprises:

obtaining a capturing roll angle, representative of a roll angle of said image capturing device for the acquisition of said current image;

determining a viewing roll angle, representative of a current roll angle of the head of a user of said head-mounted display, called a current viewing roll angle;

comparing said capturing roll angle and said current viewing angle, activating a detection flag if the difference between the capturing roll angle and the current viewing roll angle is lower than a determined threshold;

rotating said current image by a rotational angle, delivering a current rotated image, said rotational angle being determined as a function of said capturing roll angle, of said current viewing roll angle, and of said detection flag;

rendering said current rotated image.

In that way, rendering a current image on a head-mounted display takes into account not only the current roll angle of the head of a user wearing the head-mounted display, but also the roll angle of the image capturing device at the time of current image acquisition. More particularly, the proposed technique allows implementing a processing of the current image that differs depending on whether the viewing roll angle has reached the capturing roll angle or not. In that way, an adapted rendering of the current image may be performed, and the possible undesirable side effect that may be experienced by a user viewing the content may be reduced.

According to an embodiment, the current image belongs to a sequence of images and the rotational angle:

is obtained as a function of said current viewing roll angle, if said detection flag is not activated;

is equal to said capturing roll angle minus said current viewing roll angle, if said detection flag is activated.

In that way, as long as the viewing roll angle has not reached the capturing roll angle, the image rendered in the head-mounted display is enslaved to the current viewing roll angle, thus forming what may be assimilated as a kind of servo system, which may be linear or not. The proposed technique thus allows the user to find a position where his head inclination is aligned with the inclination the image capturing device had when capturing the current image, while at the same time rendering an image that is rotated in order to keep the visual perception of the rendered image consistent with the vestibular system perception. Once this position has been reached, the enslavement relationship is cancelled or at least modified, and any current viewing roll angle that goes below or above the capturing roll angle is then compensated by a corresponding image reverse rotation.

According to a particular feature of the previous described embodiment, the rotational angle:

is equal to said current viewing roll angle, if said detection flag is not activated;

is equal to said capturing roll angle minus said current viewing roll angle, if said detection flag is activated.

In that way, the function linking the rotational angle to the current viewing roll angle when the detection flag is activated is a linear function, thus corresponding to a more comfortable viewing situation for the user during the time the head-mounted display is enslaved to the current viewing roll angle.

According to an embodiment, the detection flag is deactivated on user request, or if said capturing roll angle is null.

In that way, the method may be reset or reinitialized under certain circumstances, thus allowing the head-mounted display to be enslaved again to the current viewing roll angle.

According to an embodiment rendering said current rotated image further comprises rendering a graphical indicator, said graphical indicator being determined as a function of said current viewing roll angle and said capturing roll angle.

In that way, the user has a permanently accessible and updated position feedback indicator displayed in his field of view, that helps him to apprehend his position, and to quickly figure out which movement may be performed to improve his comfort and potentially reduce motion sickness.

According to a particular feature of this embodiment, said graphical indicator comprises a background part representative of said capturing roll angle and a foreground part representative of said current viewing roll angle.

The present disclosure also concerns an apparatus for rendering a current image on a head-mounted display, said current image being acquired by an image capturing device mounted on a moving object. Such an apparatus comprises:

a module for obtaining a capturing roll angle, representative of a roll angle of said image capturing device for the acquisition of said current image;

a module for determining a viewing roll angle, representative of a current roll angle of the head of a user of said head-mounted display, called a current viewing roll angle;

a module for comparing said capturing roll angle and said current viewing angle, activating a detection flag if the difference between the capturing roll angle and the current viewing roll angle is lower than a determined threshold;

a module for rotating said current image by a rotational angle, delivering a current rotated image, said rotational angle being determined as a function of said capturing roll angle, of said current viewing roll angle, and of said detection flag;

a module for rendering said current rotated image.

According to an embodiment, the apparatus further comprises a module for deactivating said detection flag on user request or if said capturing roll angle is null.

According to an embodiment, the apparatus further comprises a module for rendering a graphical indicator, said graphical indicator being determined as a function of said current viewing roll angle and said capturing roll angle.

According to one implementation, the different steps of the method for rendering a current image on a head-mounted display as described here above are implemented by one or more software programs or software module programs comprising software instructions intended for execution by a data processor of an apparatus for rendering a current image on a head-mounted display, these software instructions being designed to command the execution of the different steps of the methods according to the present principles.

A computer program is also disclosed that is capable of being executed by a computer or by a data processor, this program comprising instructions to command the execution of the steps of a method for rendering a current image on a head-mounted display as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc.) and is capable of accessing hardware resources of this physical entity (memories, recording media, communications buses, input/output electronic boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

A non-transitory processor readable medium having stored thereon such a program is also disclosed.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF DRAWINGS

Embodiments of the present disclosure can be better understood with reference to the following description and drawings, given by way of example and not limiting the scope of protection, and in which:

FIGS. 1a and 1b, already described in relation with prior art, present how a conventional image renderer takes into account a user's head roll motion to display images previously acquired with a non laterally tilted image capturing device;

FIGS. 2a and 2b, already described in relation with prior art, present how a conventional image renderer takes into account a user's head roll motion to display images previously acquired with a laterally tilted image capturing device;

Figure 1A:
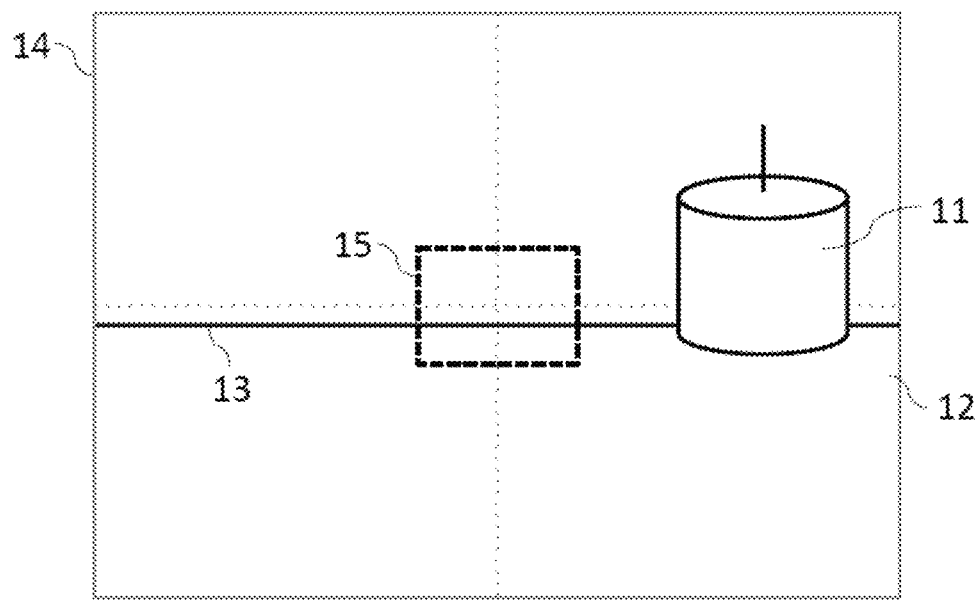
Figure 1B:
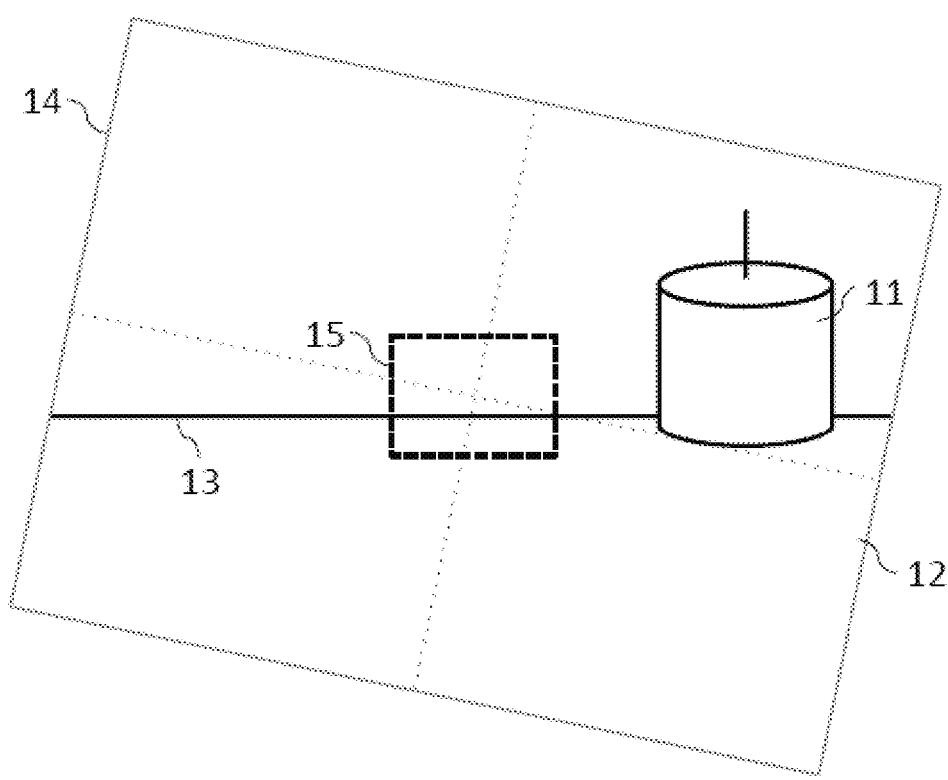

The components in the figures are not necessarily to scale, emphasis instead being placed upon illustrating the principles of the disclosure.

5. DESCRIPTION OF EMBODIMENTS

The general principle of the present disclosure relies on a specific technique for rendering a current image to be displayed on an immersive system such as a head-mounted display.

As it will be described more fully hereafter with reference to the accompanying figures, it is proposed in one aspect of the present disclosure to take into account both a current user's head roll angle and of a roll angle of the image capturing device at the time of image acquisition to adapt the rendering of a content displayed. More particularly, thanks to the proposed technique, the possible undesirable side effect that may be experienced by a user viewing the content may be reduced. A more optimal immersive experience can thus be provided.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. In the drawings, like or similar elements are designated with identical reference signs throughout the several views thereof.

While not explicitly described, the present embodiments and variants may be employed in any combination or sub-combination.

In the drawings, like or similar elements are designated with identical reference signs throughout the several views thereof.

Figure 3:
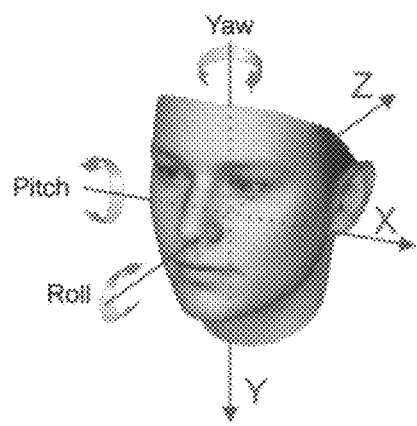
FIG. 3 is a quick reminder of how a 3D-body may be rotated about three orthogonal axes, and of the terminology used to describe these different motions.

A roll motion should be understood, throughout the present disclosure, as a rotation motion of an object around an object's front-to-back axis. As briefly reminded on FIG. 3, roll motion should notably be distinguished from yaw and pitch motions. Roll motion may result in a lateral inclination of the considered object (either a user's head or an image capturing device, in the particular context of the disclosure). Such a lateral inclination may be characterized by a roll angle with respect to a reference vertical axis, the roll angle having a value and a left or right direction. In the present description, two roll angles are considered as equal if they have the same value and the same direction.

Figure 4:
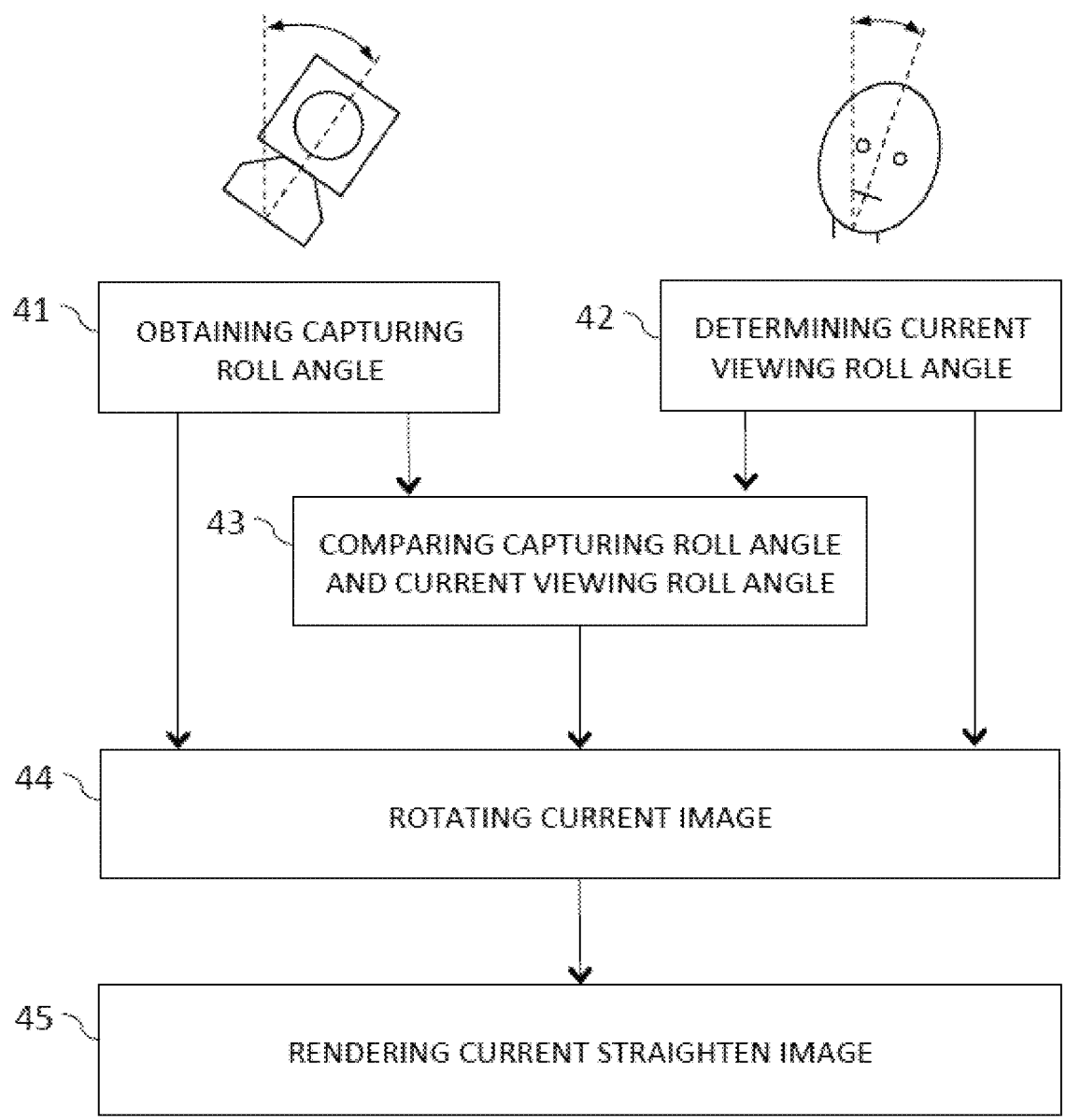
FIG. 4 is a flow chart for illustrating the general principle of the proposed technique for rendering a current image, according to an embodiment of the present disclosure.

FIG. 4 is a flow chart for explaining a method for rendering a current image, according to an embodiment of the present disclosure. The current image has been previously acquired by an image capturing device (for example a camera, a smartphone, etc.) mounted on a moving object. In the context of the present disclosure, the image capturing device is mounted on the moving object in a fixed manner, meaning that the image capturing device does not move in the frame of reference of the moving object. However, since the object on which is mounted the image capturing device is moving, the lateral inclination of the image capturing device with respect to a reference vertical axis may vary over time.

At step 41, a capturing roll angle is obtained. This capturing roll angle is representative of the roll angle of the image capturing device (i.e. the lateral inclination of the image capturing device with respect to a reference vertical axis, as previously explained in relation with FIG. 3) at the time of the acquisition of said current image. The capturing roll angle has for example been determined during image acquisition by one or several sensors embedded in the image capturing device, such as a gyroscope and/or an accelerometer, and stored as an available metadata associated with the current image. It may also be obtained from the current image itself, by image analysis techniques.

At step 42, a current viewing roll angle is determined. This angle corresponds to the current roll angle of the head of a user wearing the head-mounted display on which the current image is to be rendered. The current viewing roll angle may be determined at regular time intervals thanks to one or several sensors embedded in the head-mounted display (gyroscope, accelerometer, etc.).

Steps 41 and 42 may be processed in parallel or one after the other, whatever the order.

At step 43, the current viewing roll angle is compared to the capturing roll angle. If the difference between the current viewing roll angle and the capturing roll angle is lower than a determined threshold, a detection flag is activated. According to the present disclosure, a flag, such as the detection flag, is a two-states variable—an activated state and a deactivated state—that may be used to memorize that an event has occurred. Once activated, a flag may be deactivated afterwards, in what may be referred to as a reset (or reinitilization) operation, in response to another event for example. The determined threshold is preferably a low threshold, for example having a value between one and five degrees, so that the detection flag is activated when the current viewing roll angle and the capturing roll angle are equal or substantially equal. In other words, the detection flag is activated when it is detected that the user's head has reached a position where his head is laterally tilted the same way the image capturing device was at the time of the current image acquisition.

At step 44, the current image is rotated by a rotational angle, delivering a current rotated image. According to the general principle of the proposed technique, the rotational angle is determined as a function of the capturing roll angle (representative of the image capturing device inclination at the time of current image acquisition), of the current viewing roll angle (representative of a current inclination of the user's head), and of the detection flag (indicating whether the viewing roll angle has already reached the capturing roll angle).

Once rotated, the current image—now referred to as current rotated image—is rendered on the head-mounted display at step 45.

The proposed technique thus makes it possible to take into account the evolution of the viewing roll angle with respect to the capturing roll angle to improve the user's immersive experience. More particularly, the proposed technique allows implementing a processing of the current image that differs depending on whether the viewing roll angle has reached the capturing roll angle or not. In that way, an adapted rendering of the current image may be performed, and the possible undesirable side effect that may be experienced by a user viewing the content may be reduced. The proposed technique may be performed to render a single image, or to render the different images of a sequence of images. Indeed, in the various embodiments described in the present disclosure, the current image may belong to a sequence of images acquired by the image capturing device, each image of the sequence of images being intended to be rendered on the head-mounted display according to the proposed technique. In that case, once activated for an image preceding the current image in the sequence of images, the detection flag keeps its activated state for the rendering of the following images in the sequence of images (until it is deactivated, which may happen under specific circumstances described later in the present disclosure, in relation with a particular embodiment).

In one embodiment, the rotational angle is determined as a function of the current viewing roll angle if the detection flag is not activated; and the rotational angle is equal to the capturing roll angle minus the current viewing roll angle, if the detection flag is activated.

In other words, as long as the viewing roll angle has not reached the capturing roll angle, the image rendered in the head-mounted display is enslaved to the current viewing roll angle, thus forming what may be assimilated as a kind of servo system. Once the detection flag is activated (as described in step 43 of FIG. 4), meaning that the viewing roll angle has already reached at least once the capturing roll angle, this enslavement relationship is cancelled or at least modified, since the capturing roll angle value comes into play. Indeed, any current viewing roll angle that goes below or above the capturing roll angle is then compensated by a corresponding image reverse rotation.

The function linking the rotational angle to the current viewing roll angle when the detection flag is not activated is not necessary a linear function. In that way, some visual effect may be obtained when rendering images on the head-mounted display, such as for example a slowdown of the apparent rotation motion of the rendered images when the current viewing roll angle becomes close to the capturing roll angle.

However, according to a particular feature, the rotational angle is equal to the current viewing roll angle (a possible latency put aside) if the detection flag is not activated; and the rotational angle is equal to the capturing roll angle minus the current viewing roll angle, if the detection flag is activated. In that case, the function linking the rotational angle to the current viewing roll angle when the detection flag is activated is a linear function (identity function), which may result in a more comfortable viewing situation for the user.

In one embodiment, a previously detection flag may be deactivated under certain circumstances, thus allowing the head-mounted display to be enslaved again to the current viewing roll angle, in what may be considered as a reset or reinitialization operation. It may be the case on user request (through a dedicated control input or via a voice command for example), or if the capturing roll angle associated with the current image is null.

FIGS. 5a, 5b, 5c and 5d illustrate the effect of carrying out the proposed technique to render an image of the scene already introduced in relation with the prior art, i.e. a scene comprising a vertical cylindrical tower 11 on a flat terrain 12, previously captured by a camera embedded in a moving vehicle.

Figure 2A:
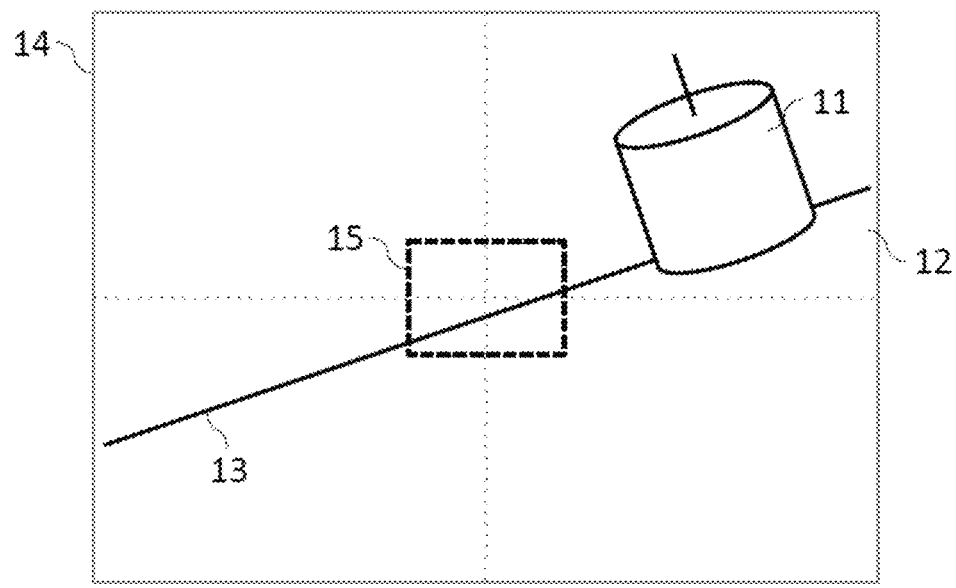
Figure 2B:
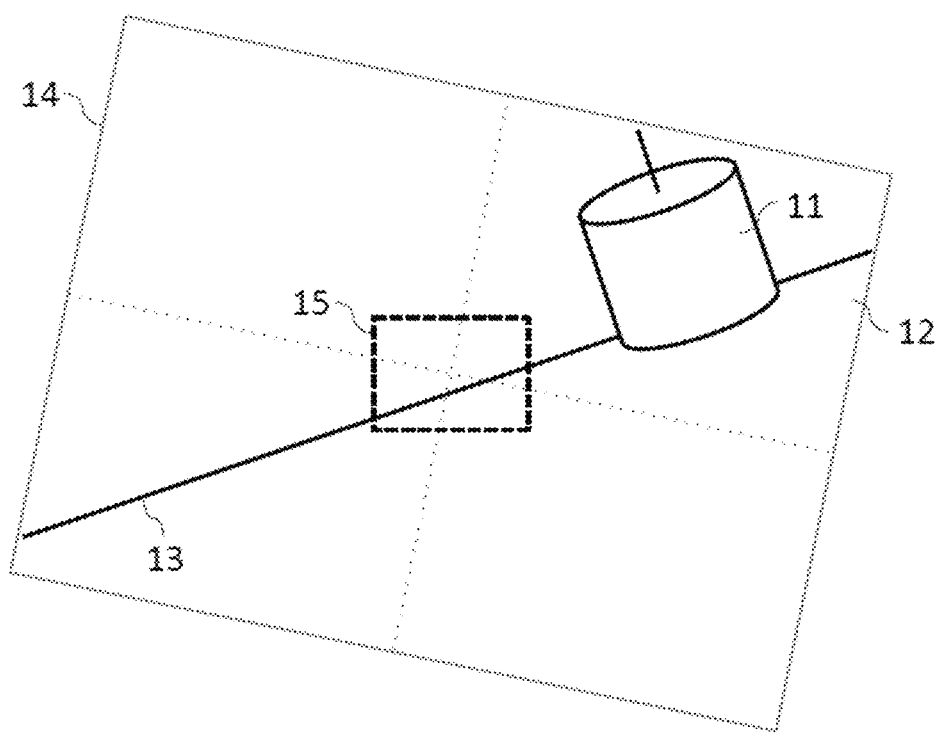
Figure 5A:
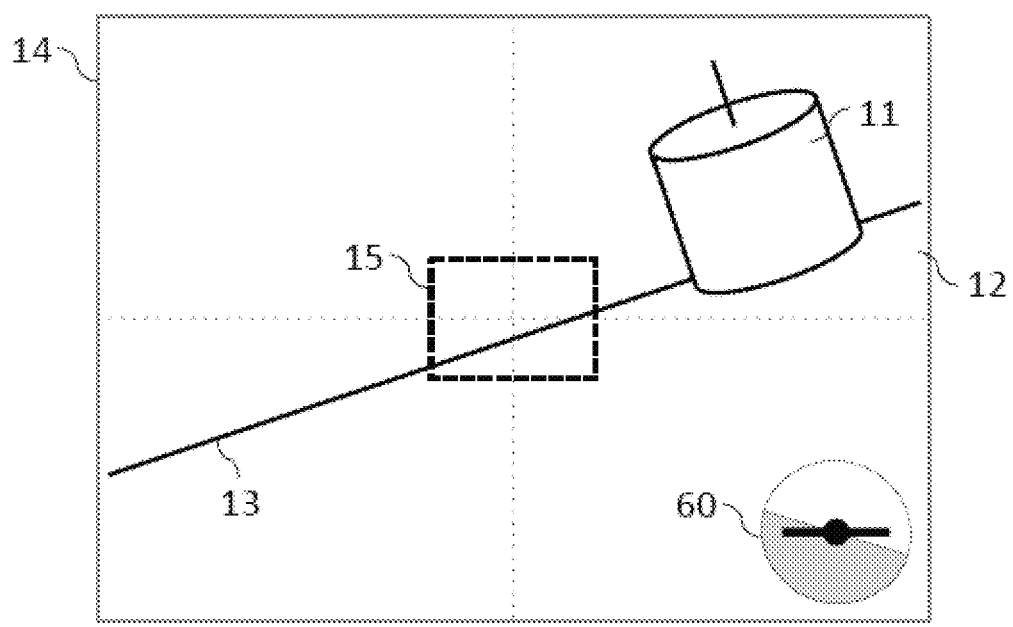
FIGS. 5a, 5b, 5c and 5d illustrate on an example the effect of applying the proposed technique for rendering a current image, according to an embodiment of the present disclosure.

The initial situation, illustrated on FIG. 5a, is similar to the one already described in relation with FIG. 2a: the image capturing device was laterally tilted on the right (non-zero roll angle) during image acquisition, for example because the carriage on which the image capturing device was embedded was turning right. As a result, within the frame of reference 15 of the image capturing device, the horizon 13 is not horizontal but seems to dive on the left. The head-mounted display—that is the user's head—is vertical. The user thus sees the horizon 13 as if he has laterally tilted his head on the right, although he hasn't, which is uncomfortable. Trying to find a correspondence between the image and his head position, the user laterally tilts his head on the right. As long as the user's head inclination is not aligned with the inclination the image capturing device had during image acquisition, the current image (i.e. the image to be rendered next on the head-mounted display) is rotated by a rotational angle which is determined as a function of the current viewing roll angle. More particularly, according to a preferred feature, this rotational angle is equal to the current viewing roll angle, so that rendered images seems to follow the user's head roll motion (same angle of rotation, same direction of rotation).

Figure 5B:
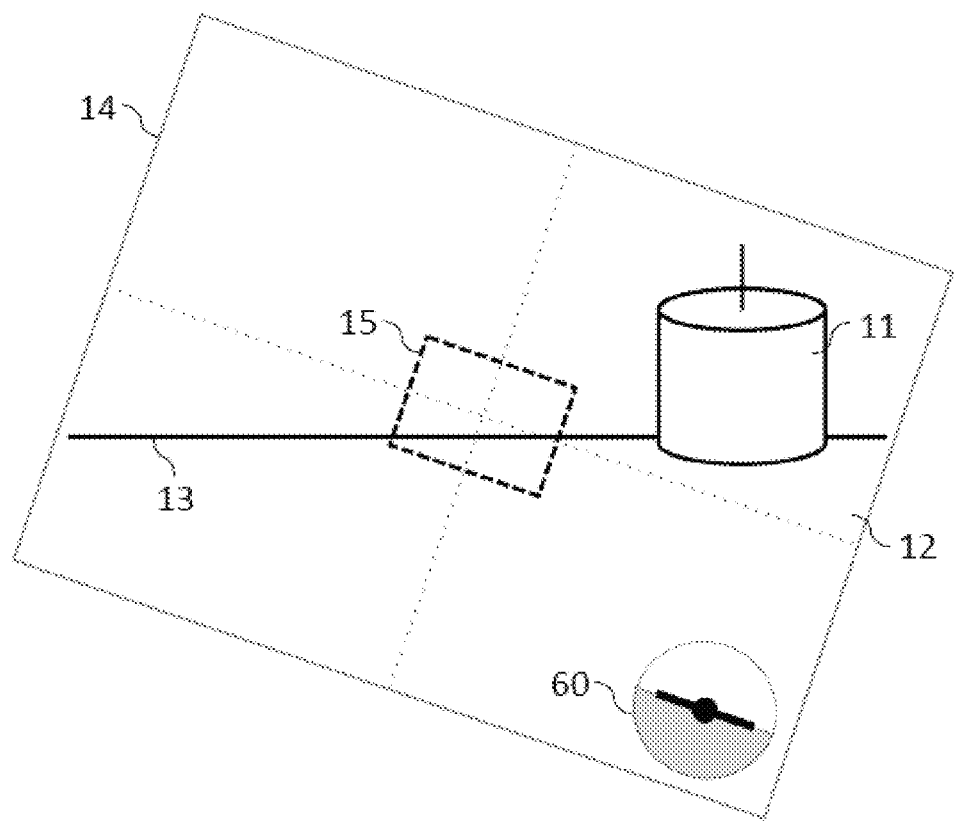
Figure 5C:
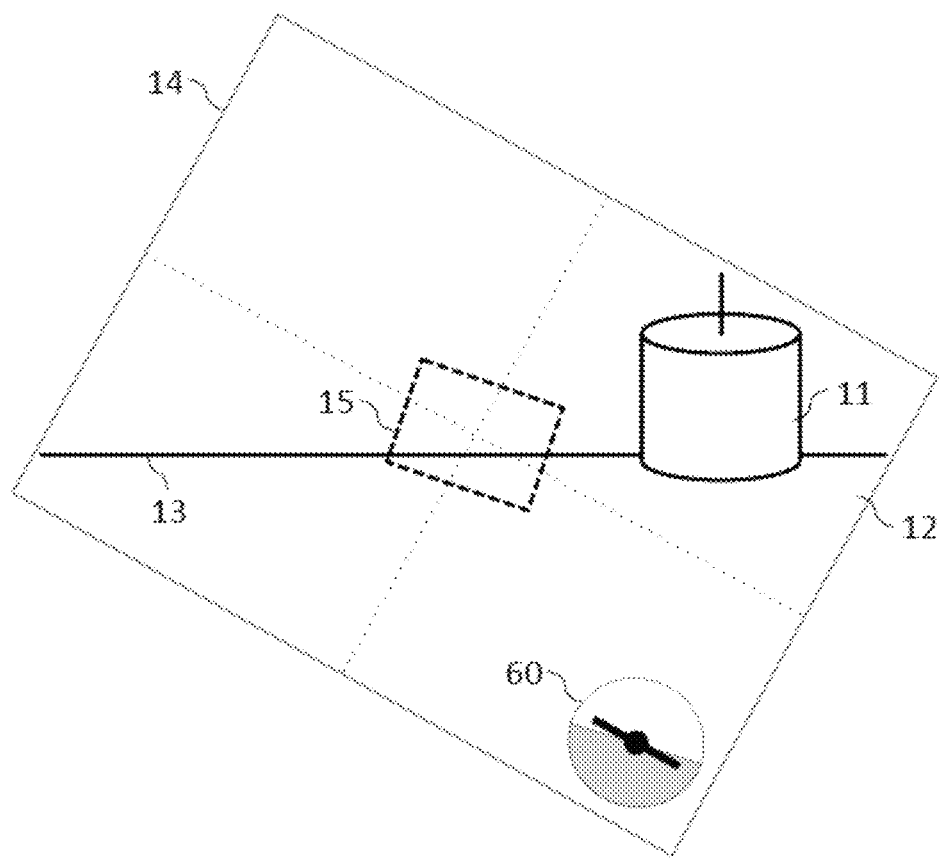
Figure 5D:
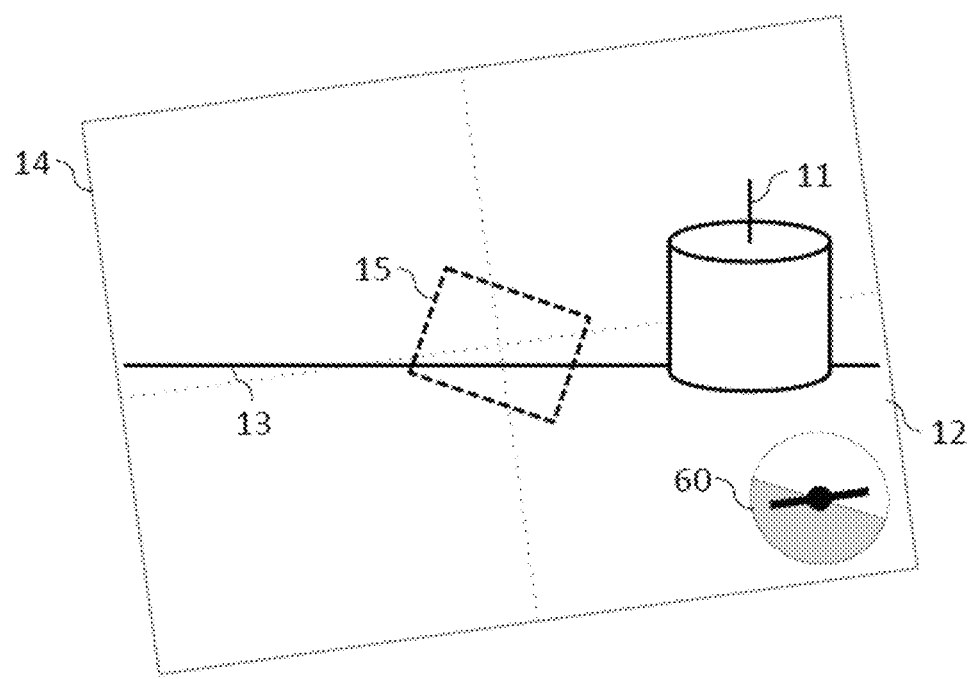

FIG. 5b illustrates the situation where the current viewing roll angle becomes equal to the capturing roll angle. At that point, the horizon 13 is horizontal on the rendered image, and the user's head is tilted the same way the image capturing device was at the time of image acquisition. The user has now retrieves a comfortable situation, regarding consistency between his visual perception and his vestibular system perception.

Beyond this point, the rotational angle of the rotation applied to the current image is equal to the capturing roll angle minus the current viewing roll angle. In other words, any rotational motion on either side along the capturing roll angle is compensated by a corresponding reverse rotation of the image, as illustrated in relation with FIGS. 5c and 5d. Thanks to this mechanism, and as it can be seen on these figures, the horizon 13 remains horizontal. The user may then choose by himself to adopt a more uncomfortable situation, as he could do in a real roller coaster carriage by leaning on his right or left, to experience thrills for example. Such situations are respectively illustrated in relation with FIG. 5c, where the user further tilts his head right, and FIG. 5d, where the user now tilts his head left.

Although it has been described in relation with a current image captured at a given capturing roll angle, it should be understood that the proposed technique is also adapted for the rendering of any sequence of images, including sequence of images acquired with a varying capturing roll angle. Indeed, any image belonging to such a sequence of images is associated with its own given capturing roll angle, and is thus eligible to be rendered according to the proposed technique.

Of course, because of the combination of user's head roll motion and virtual roll motion of the image capturing device, it may be difficult for the user to know which movement may be performed to improve his comfort and reduce motion sickness. According to an embodiment of the proposed technique, a graphical indicator is rendered in addition to the rendering of the current rotated image described at step 45 of FIG. 4. Such a graphical indicator may for example be displayed superimposed on the current rotated image rendered on the head-mounted display, to help the user to apprehend his position. In that way, the user can easily orientate his head to be aligned with the image, and thus reduce the cyber sickness sensation. To this end, the graphical indicator is determined as a function of both the capturing roll angle and the current viewing roll angle.

Figure 6:
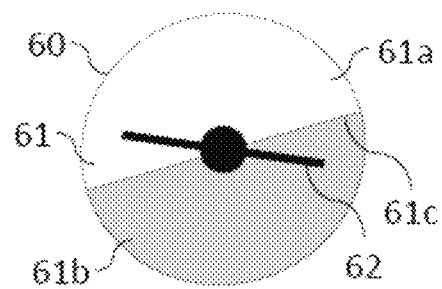
FIG. 6 depicts an example of a graphical indicator used to provide feedback to the user, regarding a current viewing roll angle and a capturing roll angle, according to an embodiment of the present disclosure.

An embodiment of such a graphical indicator is for example detailed in relation with FIG. 6. The graphical indicator 60 comprises a background part 61 representative of the capturing roll angle and a foreground part 62 representative of the current viewing roll angle. The foreground part 62 may for example take the form of a gauge or a needle, the inclination of which is representative of a current viewing roll angle. The background part 61 may for example be itself subdivided in two parts (61a, 61b), the frontier 61c of which representing, by its inclination, the capturing roll angle.

FIGS. 5a to 5d, already described, show different states of the graphical indicator 60. As it can be seen on these figures, the graphical indicator 60 provides user with up-to-date visual information about his position, easily and quickly accessible. Considering for example the situation depicted on FIG. 5b, the user can see at a glance that he is aligned with the image capturing device, i.e. with the roller coaster carriage.

While the present disclosure has been described with reference to exemplary embodiments relying mainly on images acquired by a image capturing device, it will be understood by those of ordinary skill in the pertinent art that various changes may be made and equivalents may be substituted for the elements thereof without departing from the scope of the disclosure. More particularly, the proposed technique may be used to render computer-generated images associated with virtual capturing roll angles without departing from the scope of the present disclosure.

Figure 7:
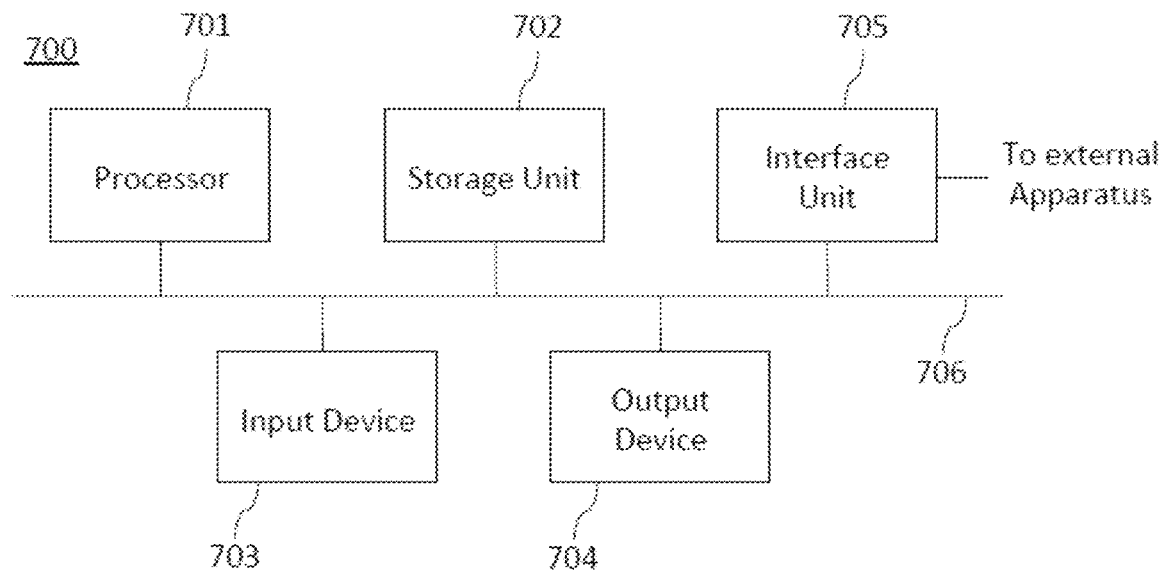
FIG. 7 is a schematic block diagram illustrating an example of an apparatus for rendering a current image, according to an embodiment of the present disclosure.

FIG. 7 is a schematic block diagram illustrating an example of an apparatus 700 for rendering a current image according to an embodiment of the present disclosure. In an embodiment of the proposed technique, such an apparatus may be embedded in a head-mounted display. In another embodiment, it may be an external apparatus connected to a head-mounted display.

The apparatus 700 includes a processor 701, a storage unit 702, an input device 703, an output device 704, and an interface unit 705 which are connected by a bus 706. Of course, constituent elements of the computer apparatus 700 may be connected by a connection other than a bus connection using the bus 706.

The processor 701 controls operations of the apparatus 700. The storage unit 702 stores at least one program to be executed by the processor 701, and various data, including for example capturing roll angle, current viewing roll angle, detection flag, parameters used by computations performed by the processor 701, intermediate data of computations performed by the processor 701, and so on. The processor 701 is formed by any known and suitable hardware, or software, or a combination of hardware and software. For example, the processor 701 is formed by dedicated hardware such as a processing circuit, or by a programmable processing unit such as a CPU (Central Processing Unit) that executes a program stored in a memory thereof.

The storage unit 702 is formed by any suitable storage or means capable of storing the program, data, or the like in a computer-readable manner. Examples of the storage unit 702 include non-transitory computer-readable storage media such as semiconductor memory devices, and magnetic, optical, or magneto-optical recording media loaded into a read and write unit. The program causes the processor 701 to perform a method for rendering a current image to be displayed on a head-mounted display according to an embodiment of the present disclosure as described previously. More particularly, the program causes the processor 701 to determine the rotational angle of a rotation to be applied to the current image, before rendering this image on a head-mounted display, so that the viewing comfort may be improved.

The input device 703 is formed for example by one or several sensors allowing determining a current viewing roll angle, i.e. a lateral inclination of the head of the user wearing the head-mounted display.

The output device 704 is formed for example by a head-mounted display to display the rotated images rendered by applying the method previously described.

The interface unit 705 provides an interface between the apparatus 700 and an external apparatus. The interface unit 705 may be communicable with the external apparatus via cable or wireless communication. For example, in an embodiment where the apparatus 700 is not embedded in a head-mounted display, an external apparatus may be such a head-mounted display.

Although only one processor 701 is shown on FIG. 7, it must be understood that such a processor may comprise different modules and units embodying the functions carried out by apparatus 700 according to embodiments of the present disclosure, such as module allowing rendering a current image acquired by an image capturing device mounted on a moving object:

a module for obtaining a capturing roll angle, representative of a roll angle of said image capturing device for the acquisition of said current image;

a module for determining a viewing roll angle, representative of a current roll angle of the head of a user of said virtual reality immersive system, called a current viewing roll angle;

a module for comparing said capturing roll angle and said current viewing angle, activating a detection flag if the difference between the capturing roll angle and the current viewing roll angle is lower than a determined threshold;

a module for rotating said current image, delivering a current rotated image, said rotational angle being determined as a function of said capturing roll angle, of said current viewing roll angle, and of said detection flag;

a module for rendering said current rotated image.

In other embodiments, the apparatus further comprises:

a module for deactivating said detection flag on user request or if said capturing roll angle is null; and/or a module for rendering a graphical indicator, said graphical indicator being determined as a function of said current viewing roll angle and said capturing roll angle.

These modules and units may also be embodied in several processors 701 communicating and co-operating with each other.

The invention claimed is:

1. A method for rendering a current image on a head-mounted display, said current image being acquired by an image capturing device mounted on a moving object, the method comprising:

obtaining a capturing roll angle, representative of a roll angle of said image capturing device for the acquisition of said current image;

determining a viewing roll angle, representative of a current roll angle of the head of a user of said head-mounted display, called a current viewing roll angle;

comparing said capturing roll angle and said current viewing roll angle and activating a detection flag if the difference between the capturing roll angle and the current viewing roll angle is lower than a determined threshold;

rotating said current image by a rotational angle, delivering a current rotated image, said rotational angle being determined as a function of said capturing roll angle, of said current viewing roll angle, and of said detection flag; and rendering said current rotated image.

2. The method of claim 1, wherein said rotational angle is obtained as a function of said current viewing roll angle, if said detection flag is not activated.

3. The method of claim 2, wherein said rotational angle is equal to said current viewing roll angle, if said detection flag is not activated.

4. The method according to claim 1, wherein said detection flag is deactivated on user request or if said capturing roll angle is null.

5. The method according to claim 1, wherein rendering said current rotated image further comprises rendering a graphical indicator, said graphical indicator being determined as a function of said current viewing roll angle and said capturing roll angle.

6. The method of claim 5, wherein said graphical indicator comprises a background part representative of said capturing roll angle and a foreground part representative of said current viewing roll angle.

7. The method of claim 1, wherein said rotational angle is equal to said capturing roll angle minus said current viewing roll angle, if said detection flag is activated.

8. An apparatus for rendering a current image on a head-mounted display, said current image being acquired by an image capturing device mounted on a moving object, the apparatus comprising:

a storage unit that stores program instructions and data; and a processor coupled to the storage unit, the processor configured to:

obtain a capturing roll angle, representative of a roll angle of said image capturing device for the acquisition of said current image;

determine a viewing roll angle, representative of a current roll angle of the head of a user of said head-mounted display, called a current viewing roll angle;

compare said capturing roll angle and said current viewing roll angle and activate a detection flag if the difference between the capturing roll angle and the current viewing roll angle is lower than a determined threshold;

rotate said current image by a rotational angle and produce a current rotated image, said rotational angle being determined as a function of said capturing roll angle, of said current viewing roll angle, and of said detection flag; and provide said current rotated image for display.

9. The apparatus of claim 8, wherein said rotational angle is obtained as a function of said current viewing roll angle, if said detection flag is not activated.

10. The apparatus of claim 9, wherein said rotational angle is equal to said current viewing roll angle, if said detection flag is not activated.

11. The apparatus according to claim 8, wherein the processor is further configured to deactivate said detection flag on user request or if said capturing roll angle is null.

12. The apparatus according to claim 8, wherein the processor is further configured to render a graphical indicator, said graphical indicator being determined as a function of said current viewing roll angle and said capturing roll angle.

13. The apparatus of claim 8, wherein said rotational angle is equal to said capturing roll angle minus said current viewing roll angle, if said detection flag is activated.

14. A non-transitory computer-readable medium comprising a computer program product recorded thereon and capable of being run by a processor, including program code instructions for implementing a method comprising:

obtaining a capturing roll angle, representative of a roll angle of said image capturing device for the acquisition of said current image;

determining a viewing roll angle, representative of a current roll angle of the head of a user of said head-mounted display, called a current viewing roll angle;

comparing said capturing roll angle and said current viewing roll angle and activating a detection flag if the difference between the capturing roll angle and the current viewing roll angle is lower than a determined threshold;

rotating said current image by a rotational angle, delivering a current rotated image, said rotational angle being determined as a function of said capturing roll angle, of said current viewing roll angle, and of said detection flag; and rendering said current rotated image.

15. An apparatus, comprising:

an input device that receives a current image and obtains a capturing roll angle, representative of a roll angle of an image capturing device for the acquisition of said current image;

a processor, coupled to the input device, the processor determining a viewing roll angle, representative of a current roll angle of the head of a user of said apparatus, called a current viewing roll angle, the processor comparing said capturing roll angle and said current viewing roll angle and activating a detection flag if the difference between the capturing roll angle and the current viewing roll angle is lower than a determined threshold, the processor additionally rotating said current image by a rotational angle and producing a current rotated image for display, said rotational angle being determined as a function of said capturing roll angle, of said current viewing roll angle, and of said detection flag; and an output device, coupled to the processor, the output device displaying said current rotated image.

* * * * *